United States Patent [19]
Becke et al.

[11] Patent Number: 5,965,678
[45] Date of Patent: Oct. 12, 1999

[54] CATALYST SYSTEM BASED ON MONOAZADIENE METAL COMPLEXES

[75] Inventors: Sigurd Becke, Rösrath; Heike Windisch, Bergisch Gladbach; Joachim Scholz; Steffen Kahlert, both of Merseburg, all of Germany

[73] Assignee: Bayer AG, Leverkusen, Germany

[21] Appl. No.: 09/096,654

[22] Filed: Jun. 12, 1998

[30] Foreign Application Priority Data

Jul. 2, 1997 [DE] Germany ............... 197 28 126

[51] Int. Cl.$^6$ .................. C08F 4/69; C08F 4/64; C08F 36/02

[52] U.S. Cl. .......... 526/160; 526/161; 526/164; 526/169; 526/282; 526/335; 526/340; 526/348.5; 526/352; 526/943; 502/103; 502/117; 502/155; 556/9; 556/11; 556/12; 556/32; 556/52; 556/53

[58] Field of Search .................. 526/160, 161, 526/943, 335, 340, 164, 169; 502/103, 117, 155; 556/9, 11, 12, 32, 35, 52, 53

[56] References Cited

U.S. PATENT DOCUMENTS

| | | |
|---|---|---|
| 5,495,036 | 2/1996 | Wilson . |
| 5,539,124 | 7/1996 | Etherton et al. ............ 556/56 X |
| 5,585,509 | 12/1996 | Langhauser et al. ......... 526/161 X |
| 5,808,122 | 9/1998 | Herrmann et al. .......... 526/161 X |

FOREIGN PATENT DOCUMENTS

| | | |
|---|---|---|
| 069 951 | 1/1983 | European Pat. Off. . |
| 129 368 | 12/1984 | European Pat. Off. . |
| 347 128 | 12/1989 | European Pat. Off. . |
| 347 129 | 12/1989 | European Pat. Off. . |
| 351-392 | 1/1990 | European Pat. Off. . |
| 485 821 | 5/1992 | European Pat. Off. . |
| 485 823 | 5/1992 | European Pat. Off. . |

OTHER PUBLICATIONS

Chem.Ber. 1993, 126, pp. 803–809, J. Scholz et al., "Monoazadien–Komplex elektronenarmer Ubergangsmetalle, I".

J. Chem. Soc., Chem. Commun., 1991, pp. 1743–1745, J. Davis et al. "1–Azadiene Complexes of Zirconocene".

Primary Examiner—Fred Teskin
Attorney, Agent, or Firm—Connolly Bove Lodge & Hutz LLP

[57] ABSTRACT

The present invention relates to a catalyst system based on monoazadiene metal complexes of the formula

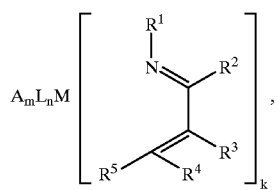

and a co-catalyst suitable for activating the metal complex, and to the use of the catalyst system for the polymerization of unsaturated compounds, especially for the polymerization and copolymerization of olefins and/or dienes.

The novel catalyst system is characterised in particular by its ease of access, its lack of sensitivity to external influences and its ease of handling.

10 Claims, No Drawings

CATALYST SYSTEM BASED ON MONOAZADIENE METAL COMPLEXES

The present invention relates to a catalyst system based on monoazadiene metal complexes and their use for the polymerization of unsaturated compounds, especially for the polymerization and copolymerization of olefins and/or dienes.

The use of metallocenes, especially the use of metallocene complexes mixed with activating co-catalysts, preferably alumoxanes, for the polymerization of olefins and diolefins has long been known (e.g. EP-A 129 368, 347 128, 347 129, 69 951, 351 392, 485 821, 485 823).

Metallocenes have proved to be highly effective, specific catalysts for the polymerization of olefins in particular. To increase the activity, selectivity, control of the microstructure, the molecular weights and the molecular weight distribution, therefore, a large number of novel metallocene catalysts and metallocene catalyst systems for the polymerization of olefinic compounds have been developed in recent years.

Special types of metallocene complexes are biscyclopentadienyl diene metal complexes as described in WO 96/04290 for the transition metals of Group IV. In combination with activating co-catalysts, the biscyclopentadienyl diene metal complexes according to WO 96/04290 are suitable for the polymerization of olefins, diolefins and/or acetylenically unsaturated monomers.

A disadvantage of the diene complexes described is that they are accessible only in small yields and are very expensive to prepare in pure form. The diene complexes are extremely sensitive to air and humidity and therefore have to be produced in so-called "glove boxes" in order to avoid decomposition of the complexes. Highly sensitive compounds, which have to be prepared and stored in "glove boxes", are formed especially when the diene complexes are activated with co-catalysts. The use of diene complexes as polymerization catalysts is disadvantageous, industrially, owing to their extreme sensitivity to impurities such as, e.g., traces of oxygen or humidity. To prevent the decomposition or deactivation of the catalysts, costly purification operations have to be carried out for e.g. the monomers, solvents and apparatus used. A further disadvantage is the poor solubility of the diene complexes in the industrial solvents conventionally used in polyolefin manufacture, such as hexane or other aliphatic hydrocarbons.

Biscyclopentadienyl monoazadiene complexes of electron-deficient transition metals, such as zirconocene monoazadiene complexes, are also known, which are capable of the addition of carbonyl or carbonyl analogue compounds (J. Scholz et al., Chem. R. 1993, 126, p. 803 ff. and J. Whitby et al., J. Chem. Soc., Chem. Commun., 1991, p. 1743 ff.). The monoazadiene metal complexes described there are, in themselves, practically inactive in the polymerization of olefinic compounds, however.

Among other things, the object therefore existed to find a catalyst system that avoids the disadvantages described above. The object consisted especially in finding a catalyst system which is stable in storage, simple to synthesize and easy to handle industrially, and which can be activated without problems for the polymerization of olefinic compounds in particular. The catalyst system should especially be capable of optimum diene polymerization.

It has now surprisingly been found that catalyst systems based on monoazadiene metal complexes are particularly well suited for the objects specified.

The present invention therefore provides a catalyst system consisting of a) a monoazadiene metal complex of the formula

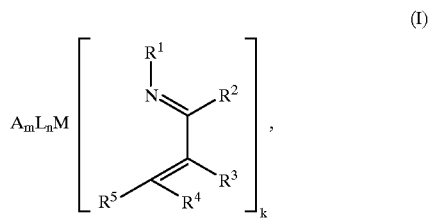

(I)

wherein

M is a metal from Group IIIb, IVb, Vb, VIb or the lanthanides or actinides of the periodic table [N. N. Greenwood, A. Earnshaw, Chemie der Elemente, VCH 1990], A signifies an optionally monobridged or polybridged anionic ligand, $R^1, R^2, R^3, R^4, R^5$ are the same or different and stand for hydrogen, halogen, a cyano group, a $C_1$ to $C_{20}$ alkyl group, a $C_1$ to $C_{10}$ fluoroalkyl group, a $C_6$ to $C_{10}$ fluoroaryl group, a $C_1$ to $C_{10}$ alkoxy group, a $C_6$ to $C_{20}$ aryl group, a $C_6$ to $C_{10}$ aryloxy group, a $C_2$ to $C_{10}$ alkenyl group, a $C_7$ to $C_{40}$ arylalkyl group, a $C_7$ to $C_{40}$ alkylaryl group, a $C_8$ to $C_{40}$ arylalkenyl group, a $C_2$ to $C_{10}$ alkynyl group, a silyl group optionally substituted by $C_1$-$C_{10}$ hydrocarbon radicals or $R^1, R^2, R^3, R^4, R^5$ form, together with the atoms linking them in each case, one or more aliphatic or aromatic ring systems, which may contain one or more heteroatoms (O, N, S) and have 5 to 10 carbon atoms, L signifies a neutral ligand, n is a number from 0 to 10, m signifies 0, 1, 2, 3 or 4 and k is 1, 2 or 3 and the sum of m+k is 1 to 5, as a function of the oxidation number of M and b) a co-catalyst suitable for activating the metal complex a), the molar ratio of component a) to component b) lying in the range of 1:0.1 to 1:10000, preferably 1:1 to 1:1000.

Suitable monoazadiene metal complexes of formula (I) are especially those in which M is a metal from Group IVb, Vb or the lanthanides of the periodic table, A is an allyl group with the formula $C_3R^6{}_5$, wherein $R^6$ has the same meaning as $R^1$ to $R^5$ in formula (I), a halide (F, Cl, Br, I), a sulphonate with the formula $O_3SR^6$, an amide with the formula $NR^6{}_2$, a pyrazolate with the formula $N_2C_3R^7{}_3$ with $R^7$ for hydrogen or a $C_1$-$C_{10}$ alkyl group, a pyrazolyl borate with the formula $R^6B(N_2C_3R^7{}_3)_3$ an alcoholate or phenolate with the formula $OR^6$, a siloxane with the formula $OSiR^6{}_3$, a thiolate with the formula $SR^6$, an acetyl acetonate with the formula $(R^1CO)_2CR^6$, a diimine with the formula $(R^1N=CR^6)_2$, a cyclopentadienyl with the formula $C_5H_qR^6{}_{5-q}$ with q for 0, 1, 2, 3, 4, 5, an indenyl with the formula $C_9H_{7-r}R^6{}_r$ with r for 0, 1, 2, 3, 4, 5, 6, 7, a fluorenyl with the formula $C_{13}H_{9-s}R^6{}_s$ with s for 0, 1, 2, 3, 4, 5, 6, 7, 8, 9 and a $C_1$ to $C_{30}$ alkyl radical, a $C_6$ to $C_{10}$ aryl radical and a $C_7$ to $C_{40}$ alkylaryl radical, $R^1$ to $R^5$ stand for a $C_1$-$C_{30}$ alkyl group, a $C_6$-$C_{10}$ aryl group, a $C_7$-$C_{40}$ alkylaryl group, especially hydrogen, methyl, ethyl, n-propyl, isopropyl, n-butyl, isobutyl, tert.-butyl, phenyl, methylphenyl, cyclohexyl and benzyl, L stands for an ether with the formula $R^6$—O—$R^6$ or thioether with the formula $R^6$—S—$R^6$ or an amine with the formula $NR^6{}_3$ or a phosphine with the formula $PR^6{}_3$, n is a number from 0 to 4 and m and k have the meaning mentioned above, wherein the anionic ligands A may be mono- or polybridged, preferably mono- or dibridged, by divalent groups with the formulae $CR^8{}_2$, $C_2R^8{}_2$, $SiR^8{}_2$, $Si_2R^8{}_4$, $GeR^8{}_2$, $GeR^8{}_4$, $R^8{}_2SiCR^8{}_2$, $BR^8$, $AlR^8$, $NR^8$ and $PR^8$, in which the substituents $R^8$ are the same or different and stand for hydrogen, $C_1$-$C_{20}$ alkyl, $C_3$-$C_{20}$ cycloalkyl, $C_2$-$C_{20}$ alkenyl, $C_6$-$C_{20}$ aryl, $C_7$-$C_{20}$ alkylaryl or $C_7$-$C_{20}$ aralkyl, or by an oxygen or sulphur atom.

Monoazadiene metal complexes of formula (I) in which

M stands for titanium, zirconium, hafnium, vanadium, niobium or tantalum,

A stands for cyclopentadienyl, methylcyclopentadienyl, benzylcyclopentadienyl, n-butylcyclopentadienyl, pentamethylcyclopentadienyl, indenyl, 2-methyl-4,5-benzoindenyl, 2-methylbenzoindenyl, 2-methyl-4-phenylindenyl, (4,5,6,7)-tetrahydroindenyl, 2,4,7-trimethylindenyl, 2-methyl-4-(1-naphthyl)indenyl or fluorenyl, L stands for diethyl ether, tetrahydrofuran or tetrahydrothiophene, and the anionic ligands A are bridged by the divalent groups $Me_2Si$, $Ph_2Si$, $Ph(Me)Si$, $Me_2C$, $Ph_2C$, $Ph(Me)C$ and $CH_2CH_2$, are especially preferred. As a result of the bridging of two ligands A, which may be the same or different, a dianionic ligand system is obtained such as, e.g.,
ethylenebis(indenyl),
ethylenebis(4,5,6,7-tetrahydroindenyl),
ethylenebis(2-methylindenyl),
ethylenebis(2,4-dimethylindenyl),
ethylenebis(2-methyl-4,5-benzoindenyl),
ethylenebis(2-methyl-4,6-diisopropylindenyl),
ethylenebis(2-methyl-4-phenylindenyl),
ethylenebis(2-methyl-4-(1-naphthyl)indenyl),
ethylenebis(2-methyl-4-ethylindenyl),
ethylenebis(2-methyl-4-isopropylindenyl),
ethylenebis(2-methyl-4-methylindenyl),
ethylenebis(2-methyl-α-acenaphth-1-indenyl),
dimethylsilanediylbis(indenyl),
dimethylsilanediylbis(2-methyl-4-ethylindenyl),
dimethylsilanediylbis(2-methyl-4-isopropylindenyl),
dimethylsilanediylbis(2-methyl-4-methylindenyl),
dimethylsilanediylbis(2-methyl-4,5-benzoindenyl),
dimethylsilanediylbis(2-methyl-4,6-disopropylindenyl),
dimethylsilanediylbis(2-methyl-4-phenylindenyl),
dimethylsilanediylbis(2-methyl-4-(1-naphthyl)indenyl),
dimethylsilanediylbis(2-methyl-α-acenaphth-1-indenyl), isopropylidene(9-fluorenyl)cyclopentadienyl,
diphenylmethylene(9-fluorenyl)cyclopentadienyl,
phenylmethylmethylene(9-fluorenyl)cyclopentadienyl,
dimethylsilanediyl(9-fluorenyl)cyclopentadienyl,
isopropylidene(9-fluorenyl)-(3-methylcyclopentadienyl),
phenylmethylmethylene(9-fluorenyl)(3-methylcyclopentadienyl) or
dimethylsilanyl(9-fluorenyl)(3-methylcyclopentadienyl).

The formula (I) given for the monoaza metal complexes should be regarded as a formal representation of the bonding relationships and represents an example of a structural variant. As is known to the expert, the bonding relationships of the metal complex depend on, among other things, the central atom, the oxidation number and the substituents of the monoazadiene ligand.

Monoazadiene metal complexes of formula (II)

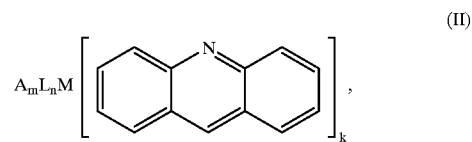

(II)

wherein A, L, M and m, n, k have the meaning mentioned above for formula (I), or those of formula (III)

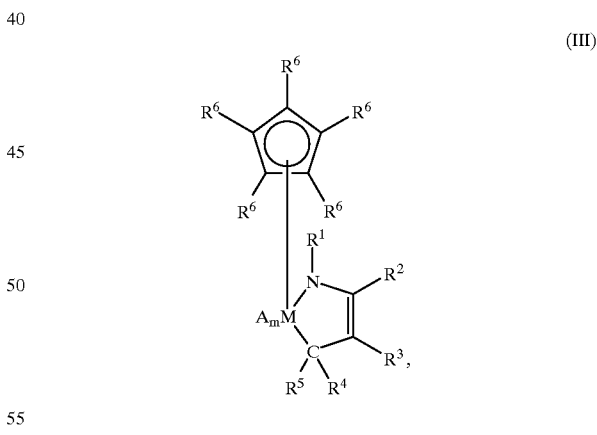

(III)

wherein M, A and $R^1$ to $R^6$ and m have the meaning mentioned above, or monoazadiene metal complexes of formula (IV)

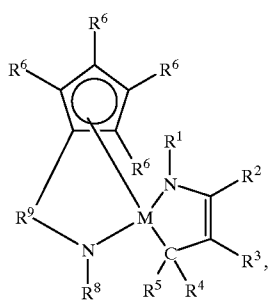
(IV)

or monoaza metal complexes of formula (V)

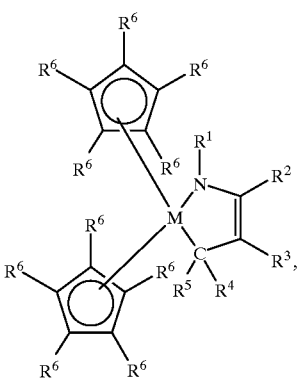
(V)

wherein M, A, $R^1$ to $R^6$, $R^8$ and m have the meaning mentioned above and $R^9$ signifies one of the divalent groups mentioned above, or monoazadiene metal complexes of formula (VI)

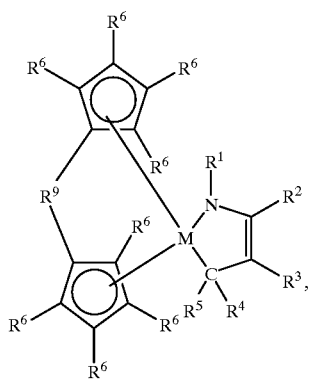
(VI)

or monoazadiene metal complexes of the formula (VII)

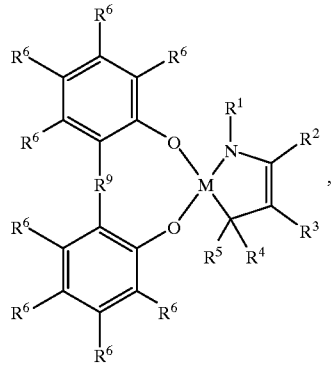
(VII)

wherein M and $R^1$ to $R^6$ and $R^9$ have the meaning mentioned above, are especially suitable. In the compounds of formulae (III) to (VII), two adjacent radicals $R^6$ may form one or more aliphatic or aromatic ring systems together with the atoms linking them in each case, and may have 5–10 carbon atoms.

Suitable special types of monoazadiene complexes are those of the formula (VIII)

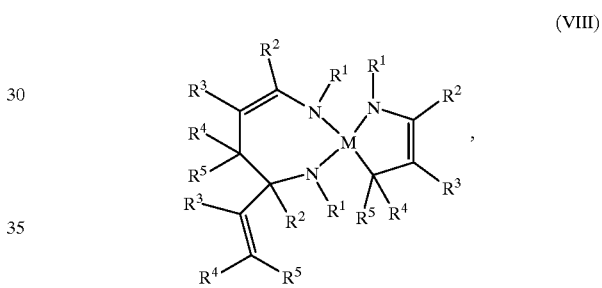
(VIII)

wherein M and $R^1$ to $R^5$ have the abovementioned meaning.

Suitable co-catalysts are the co-catalysts known in the field of metallocenes, such as polymeric or oligomeric alumoxanes, Lewis acids and aluminates and borates. Particular reference is made in this connection to Macromol. Symp. vol. 97, July 1995, p.p. 1–246 (for alumoxanes) and to EP 277 003, EP 277 004, Organometallics 1997, 16, 842–857 (for borates) and EP 573 403 (for aluminates).

Methyl aluminoxane, methyl aluminoxane modified with triisobutylaluminium, and diisobutyl aluminoxane, trialkylaluminium compounds such as trimethylaluminium, triethylaluminium, triisobutylaluminium, triisooctylaluminium and also dialkylaluminium compounds such as diisobutylaluminium hydride, diethylaluminium chloride, substituted triaryl boron compounds such as tris (pentafluorophenyl)borane, and ionic compounds containing as anion tetrakis(pentafluorophenyl) borate, such as triphenylmethyltetrakis(pentafluorophenyl) borate, trimethylammoniumtetrakis(pentafluorophenyl) borate, N,N-dimethylaniliniumtetrakis(pentafluorophenyl) borate, substituted triarylaluminium compounds such as tris (pentafluorophenyl)aluminium, and ionic compounds containing as anion tetrakis(pentafluorophenyl) aluminate, such as triphenylmethyltetrakis(pentafluorophenyl) aluminate, N,N-dimethylaniliniumtetrakis(pentafluorophenyl) aluminate, are especially suitable as co-catalysts.

It is, of course, possible to use the co-catalysts in mixtures with one another. The most favourable mixture ratios should be determined in each case by appropriate preliminary tests.

The synthesis of the monoazadiene metal complexes of formula (I) is known and described, for example, in Scholz et al., Chem. Ber. 126 (1993), p.p. 803–809.

One possibility for the preparation of the monoazadiene metal complexes of formula (I) consists in that a metal halogen complex with the formula $A_mL_nMX$, wherein A, L, M and m, n have the meaning given above and X stands for F, Cl, Br or I, is dehalogenated in the presence of a monoazadiene with a suitable reducing agent. Suitable reducing agents are, for example, alkali metals, alkaline earth metals, aluminium, zinc, alloys of alkali metals or alkaline earth metals, e.g. sodium/mercury alloy or sodium/potassium alloy. Suitable reducing agents are also sodium naphthalenide, potassium graphite, lithium alkyls and aluminium alkyl compounds. Lithium, magnesium, Grignard compounds and n-butyllithium are particularly preferred. Suitable solvents for the formation of monoazadiene complexes are aliphatic and aromatic hydrocarbons, halogenated hydrocarbons, ethers and cyclic ethers. Examples of these are pentane, hexane, heptane, octane, cyclohexane, methylcyclohexane, benzene, toluene, xylene, dialkyl ether and tetrahydrofuran. Mixtures of various solvents are also suitable.

The preparation of the monoazadiene metal complexes of formula (1) may be formally represented as follows:

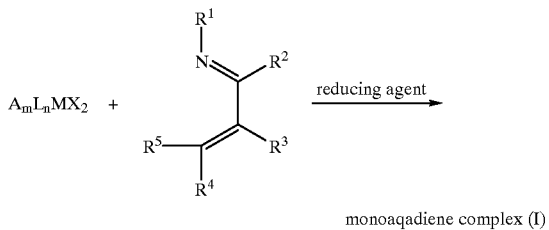

monoaqadiene complex (I)

The synthesis of the monoazadiene complexes can also be carried out very simply on an industrial scale. Monoazadienes are readily accessible. The monoazadiene complexes can be produced in high yields and in a very pure form owing to their good crystallisation capacity. The precursors with the formula $A_mL_nMX_2$ do not have to be present in pure form since complexes which are readily crystallised and easily purified are obtained from the reaction with monoazadienes. This purification method is particularly advantageously suited to the separation of mixtures of chiral monoazadiene complexes of formula (VI) into the rac. and meso form. The rac. form of $C_2$-symmetrical ansa-metallocenes is especially suitable for stereospecific olefin polymerization, e.g. for the production of isotactic polypropylene (Angew. Chem. 1985, 97, 507).

The present invention also provides a method for the preparation of chiral monoazadiene complexes of formula (VI) in the rac. form.

The present invention also provides the use of the novel catalyst system for the polymerization of unsaturated compounds, especially of olefins and dienes. Polymerization here means both homo- and copolymerization of the said unsaturated compounds. In particular, $C_2$-$C_{10}$ alkenes, such as ethylene, propylene, 1-butene, 1-pentene and 1-hexene, 1-octene, isobutylene and arylalkenes such as styrene are used in the polymerization. Conjugated dienes, such as 1,3-butadiene, isoprene, 1,3-pentadiene, and non-conjugated dienes, such as 1,4-hexadiene, 1,5-heptadiene, 5,7-dimethyl-1,6-octadiene, 4-vinyl-1-cyclohexene, 5-ethylidene-2-norbornene, 5-vinyl-2-norbornene and dicyclopentadiene are especially used as dienes.

The catalysts according to the invention are preferably suitable for the preparation of rubbers based on copolymers of ethylene with one or more of the α-olefins and dienes mentioned. In addition, the catalyst system according to the invention is suitable for the polymerization of cyclo-olefins such as norbornene, cyclopentene, cyclohexene, cyclooctane, and the copolymerization of cycloolefins with ethylene or α-olefins. Chiral monoazadiene complexes may be used as catalysts for stereospecific olefin polymerization.

The polymerization may be carried out in the liquid phase, in the presence or absence of an inert solvent, or in the gas phase. Aromatic hydrocarbons, such as benzene and/or toluene, or aliphatic hydrocarbons, such as propane, hexane, heptane, octane, isobutane, cyclohexane or mixtures of the various hydrocarbons are suitable as solvents.

It is possible to use the catalyst system according to the invention applied on a support. The following may be mentioned as examples of suitable support materials: inorganic or organic polymer supports such as silica gel, zeolites, carbon black, activated charcoal, aluminium oxide, polystyrene and polypropylene.

The catalyst system according to the invention may be applied on to the support materials by conventional means. Methods of applying catalyst systems on to a support are described, for example, in U.S. Pat. Nos. 4,808,561, 4,912,075, 5,008,228 and 4,914,253.

The polymerization is generally carried out under pressures of 1 to 1000, preferably 1 to 100 bar, and at temperatures of −100 to +250° C., preferably 0 to +150° C. The polymerization may be carried out continuously or batch-wise in conventional reactors.

Owing to its excellent stability in solution, the catalyst system according to the invention may be used particularly well in a continuous industrial process by the solution method.

The invention is explained in more detail with the aid of the following examples.

EXAMPLES

Example 1

Preparation of 2-chloro-2-cyclopentadienyl-1-cyclohexyl-4-methyl-3-phenyl-1-aza-2-titana-cyclopent-4-ene To a solution of 5 g (22.79 mmol) cyclopentadienyltitanium(IV) chloride in 100 ml THF were added 5.18 g (22.79 mmol) 1-cyclohexyl-3-methyl-4-phenyl-1-aza-buta-1,3-diene and 0.55 g magnesium and the mixture was stirred at room temperature until the metal was fully reacted. The solvent was then removed to dryness in vacuo and the residue was extracted with 50 ml diethyl ether. 4.36 g 2-chloro-2-cyclopentadienyl-1-cyclohexyl-4-methyl-3-phenyl-1-aza-2-titana-cyclopent-4-ene were isolated from the diethyl ether extract as dark brown crystals. (51% yield, characterised by $^1$H-NMR, $^{13}$C-NMR and elemental analysis).

Polymerization of ethylene 100 ml toluene and 5 ml of a 10% solution of methyl aluminoxane (MAO) were placed in a 250 ml glass reactor. Ethylene was then introduced into the solution continuously under a pressure of 1.1 bar using a gas delivery tube. The polymerization was initiated by adding a solution of 3.75 mg (10 μmol) 2-chloro-2-cyclopentadienyl- 1-cyclohexyl-4-methyl-3-phenyl-1-aza-2-titana-cyclopent-4-ene in 5 ml toluene. At a temperature of 20° C. and an ethylene pressure of 1.1 bar the reaction was terminated after a 15 min polymerization period by adding 10 ml methanol, the resulting polymer was filtered off, washed with acetone and dried in a vacuum drying oven. 1.6 g polyethylene were obtained.
Example 2
Polymerization of 1,3-butadiene 12.2 mg (32.5 μmol) 2-chloro-2-cyclopentadienyl-1-cyclohexyl-4-methyl-3 -phenyl-1-aza-2-titana-cyclopent-4-ene (prepared in accordance with Example 1) were dissolved in 9.8 ml of a 10% solution of MAO in toluene at 20° C. The titanium complex dissolved with a green colour and was added to a monomer solution consisting of 150 ml toluene and 22 g 1,3-butadiene. The polymerization was carried out at 20° C. in a homogeneous solution and terminated after 30 min by adding 10 ml methanol with 0.3 g Vulkanox BKF as stabiliser. The polymer was precipitated in methanol and dried in a vacuum drying oven at 60° C. 2.0 g of a polybutadiene were obtained with a selectivity distribution of 80.8% 1,4-cis, 2.6% 1,4-trans and 16.5% 1,2-units.
Example 3
Polymerization of 1,3-butadiene in the presence of styrene The polymerization from Example 2 was repeated, with the difference that 10 μmol of the catalyst were used and 10 ml styrene were additionally added to the monomer solution consisting of 80 ml toluene and 11.6 g butadiene. The polymerization took place for 60 min at 20° C. 2.4 g of a polybutadiene were isolated.
Example 4
Preparation of bis(cyclopentadienyl)zirconium acridine To a solution of 5.00 g (17.10 mmol) zirconocene dichloride in 100 ml THF were added 3.06 g (17.10 mmol) acridine and 0.41 g magnesium and the mixture was stirred at room temperature until the metal was fully reacted. The solvent was then removed to dryness in vacuo and the residue was extracted with 80 ml toluene. 4.29 g bis (cyclopentadienyl)zirconium acridine were isolated from the toluene extract as a red solid.
Polymerization of ethylene 500 ml toluene, 0.1 ml TIBA and 1 ml of a solution of 2.0 mg (5 μmol) bis(cyclopentadienyl)zirconium acridine in 10 ml toluene were placed in a 1.4 l steel autoclave. This solution was brought to a temperature of 80° C. Ethylene was then added until the internal reactor pressure rose to 7 bar. The polymerization was initiated by adding a solution of 2.5 mg (5 μmol) tris(pentafluorophenyl)borane in 5 ml toluene. After a polymerization period of 15 min at 80° C. and 7 bar the autoclave was depressurised, the polymer was filtered off, washed with acetone and dried for 20 h at 60° C. in vacuo. 22.1 g polyethylene were obtained.
Example 5
Preparation of 2,2-bis(cyclopentadienyl)-1-cyclohexyl-3-phenyl-1-aza-2-zirconacyclopent-4-ene To a solution of 10.00 g (34.21 mmol) zironocene dichloride in 150 ml THF are added 7.30 g (34.21 mmol) 1-cyclohexyl-4-phenyl-1-aza-buta-1,3-diene and 0.83 g magnesium and the mixture was stirred at room temperature until the metal was fully reacted. The solvent was then removed to dryness in vacuo and the residue was extracted with 80 ml diethyl ether. 11.21 g 2,2-bis(cyclopentadienyl)-1-cyclohexyl-3 -phenyl-1-aza-2-zircona-cyclopent-4-ene were isolated from the diethyl ether extract as an orangey-yellow solid (75% yield, characterised by $^1$H-NMR, $^{13}$C-NMR and elemental analysis).
Preparation of the catalyst solution 10.4 mg (23.92 μmol) 2,2-bis(cyclopentadienyl)-1-cyclohexyl-3-phenyl-1-aza-2-zircona-cyclopent-4-ene were dissolved in 22.8 ml hexane and 1.2 ml TIBA.
Copolymerization of ethylene with 1-hexene 500 ml hexane, 50 ml 1-hexene and 1 ml of the catalyst solution were placed in a 1.4 l steel autoclave. This solution was brought to a temperature of 70° C. Ethylene was then added until the internal reactor pressure rose to 7 bar. The polymerization was initiated by adding a solution of 0.92 mg (1 μmol) triphenylmethyl-tetrakis(pentafluorophenyl) borate in 5 ml toluene. After a polymerization period of 25 min at 70° C. and 7 bar the autoclave was depressurised, the polymer was filtered off, washed with acetone and dried for 20 h at 60° C. in vacuo. 24 g of an ethylene/1-hexene copolymer were obtained.
Example 6
Preparation of 2,2-[(rac.-dimethylsilyl-bis(1-indenyl)]-1-(tert-butyl)-3-phenyl-1-aza-2-zircona-cyclopent-4-ene To a solution of 1.10 g (2.45 mmol) rac.-dimethylsilylbis (1-indenyl)zirconium dichloride in 50 ml THF were added 0.46 g (2.45 mmol) 1-(tert-butyl)-4-phenyl-1-azabuta-1,3-diene and 0.06 g magnesium and the mixture was stirred at room temperature until the metal was fully reacted. The solvent was then removed to dryness in vacuo and the residue was extracted with 30 ml pentane. 0.50 g 2,2-[(rac.-dimethylsilyl-bis(1-indenyl)]-1-(tert-butyl)-3-phenyl-1-aza-2-zircona-cyclopent-4-ene was isolated from the pentane extract as an orange-coloured solid (34% yield, characterised by $^1$H-NMR and $^{13}$C-NMR.)
Preparation of the catalyst solution 32.7 mg (57.9 μmol) 2,2-[(rac.-dimethylsilyl-bis(1-indenyl)]-1-(tert-butyl)-3-phenyl-1-aza-2-zircona-cyclopent-4-ene were dissolved in 55 ml hexane and 2.9 ml TIBA.
Polymerization of propylene 500 ml hexane, 0.1 ml TIBA, 200 g propylene and 2 ml of the catalyst solution were placed in a 1.4 l steel autoclave. This solution was brought to a temperature of 50° C. The polymerization was initiated by adding a solution of 1.8 mg CPh3[B(C6F5)4] in 5 ml toluene. After a polymerization period of 1 h at 50° C. the reaction was terminated by adding methanol, the polymer was filtered off and dried for 20 h at 60° C. in vacuo. 158 g isotactic polypropylene were obtained.
Example 7
Preparation of 2,2-bis(cyclopentadienyl)-1-cyclohexyl-4-methyl-3-phenyl-1-aza-2-titana-cyclopent-4-ene To a solution of 5.00 g (20.08 mmol) titanocene dichloride in 100 ml THF were added 4.57 g (20.08 mmol) 1-cyclohexyl-3-methyl-4-phenyl-1-aza-buta-1,3-diene and 0.83 g magnesium and the mixture was stirred at room temperature until the metal was fully reacted. The solvent was then removed to dryness in vacuo and the residue was extracted with 50 ml diethyl ether. 5.31 g 2,2-bis (cyclopentadienyl)-1-cyclohexyl-4-methyl-3-phenyl-1-aza-2-titana-cyclopent-4-ene were isolated from the diethyl ether extract as black crystals. (65% yield, characterised by $^1$H-NMR, $^{13}$C-NMR and elemental analysis).
Copolymerization of ethylene and propylene 500 ml toluene were placed in a 1.4 l steel autoclave equipped with a mechanical stirrer, pressure gauge, temperature probe, a temperature control device, a catalyst sluice and monomer metering devices for ethylene and propylene. To this was added 5 ml of a 10% solution of MAO in toluene and the mixture was stirred for 10 min. 57 g propylene were then added. The internal temperature was set to 70° C. with a thermostat. Ethylene was then added until the internal reactor pressure rose to 7 bar. The polymerization was initiated by adding a solution of 10 mg 2,2-bis(cyclopentadienyl)-1-cyclohexyl-4-methyl-3-phenyl-1-aza-2-titana-cyclopent-4-ene and ethylene was added continuously at 70° C. so that the internal pressure was kept at a constant 7 bar. After a polymerization period of 1 hour the polymerization was terminated with a 1% HCl solution in methanol, the mixture was stirred for 10 min and the polymer was then precipitated with methanol. The polymer thus obtained was washed with methanol, isolated and dried for 20 h at 60° C. in vacuo, 44.1 g copolymer being obtained. Determination of the composition of the copolymer by IR spectroscopy showed an incorporation of 68.1% ethylene and 31.9% propylene. A Tg of −53° C. was determined by the DSC method.

Example 8

Preparation of 2,2-[(rac.-ethylene-bis(1-indenyl)]-1-(tert-butyl)-3-phenyl-1-aza-2-zircona-cyclopent-4-ene To a solution of 1.82 g (4.35 mmol) rac.-ethylenebis(1-indenyl)zirconium dichloride in 50 ml THF were added 0.82 g (4.35 mmol) 1-(tert-butyl)-4-phenyl-1-aza-buta-1,3-diene and 0.10 g magnesium and the mixture was stirred at room temperature until the metal was fully reacted. The solvent was then removed to dryness in vacuo and the residue was extracted with 30 ml diethyl ether. 0.98 g 2,2-[(rac.-ethylene-bis(1-indenyl)]-1-(tert-butyl)-3-phenyl-1-aza-2-zircona-cyclopent-4-ene was isolated from the diethyl ether extract as an orange-coloured solid (40% yield, characterised by $^1$H-NMR and $^{13}$C-NMR.)

Preparation of the catalyst solution 23.6 mg (44 μmol) 2,2-[(rac.-ethylene-bis(1-indenyl)]-1-(tert-butyl)-3-phenyl-1-aza-2-zircona-cyclopent-4-ene were dissolved in 41.8 ml hexane and 2.2 ml triisobutylaluminium (TIBA). This catalyst solution was stored at 20° C. in a Schlenk vessel under argon.

Terpolymerization of ethylene, propylene and 5-ethylidene-2-norbornene (ENB)

500 ml hexane and 0.1 ml TIBA were placed in a 1.4 l steel autoclave equipped with a mechanical stirrer, pressure gauge, temperature probe, a temperature control device, a catalyst sluice and monomer metering devices for ethylene and propylene. To this was added 1 ml of the freshly prepared catalyst solution. 5 ml 5-ethylidene-2-norbornene (ENB) were then added. The internal temperature was set to 80° C. with a thermostat. 22 g ethylene and 38 g propylene were then added. The polymerization was initiated by adding a solution of 1.0 mg CPh3[B(C6F5)4] in 5 ml toluene. In a semi-batch operation, ethylene and propylene were added continuously in a mass ratio of 3:2 so that the internal pressure at 80° C. was kept at a constant 4 bar. After a polymerization period of 1hour, a 0.1 wt. % hexane solution of Vulkanox BKF was added to the polymer solution, the mixture was stirred for 10 min and the polymer was then precipitated with methanol. The polymer thus obtained was isolated and dried for 20 h at 60° C. in vacuo, 121.7 g of terpolymer being obtained. Determination of the composition of the terpolymer by IR spectroscopy showed an incorporation of 66.4% ethylene, 29.9% propylene and 3.7% ENB. A Tg of −51° C. was determined by the DSC method.

Example 9

Terpolymerization of ethylene, propylene and ENB

The polymerization according to Example 8 was repeated, with the difference that 1 ml of the catalyst solution from Example 8 was used after a storage period of 30 days. 121.0 g of terpolymer were obtained with an incorporated ratio of 66.2% ethylene, 30.0% propylene and 3.8% ENB. A Tg of −50° C. was determined by the DSC method.

Example 10

Terpolymerization of ethylene, propylene and ENB

The polymerization of Example 9 was repeated, with the difference that, in addition to 500 ml hexane and 0.1 ml TBA, 50 g propylene and 10 ml ENB were also placed into the autoclave, the temperature was brought to 50° C. and ethylene was added continuously under a pressure of 4 bar. The reaction was terminated after a polymerization period of 35 min. 99.3 g of terpolymer were obtained with an incorporated ratio of 57.4% ethylene, 34.2% propylene and 9.2% ENB. The Tg measured by DSC is −48° C.

Example 11

Preparation of 2,2'-[(rac-ethylene-bis(tetrahydroindenyl)]-1-(tert-butyl)-3-phenyl-1-aza-2-zircona-cyclopent-4-ene 1.22 g (2.86 mmol) of rac-ethylenebis(tetrahydroindenyl) zirconium dichloride were suspended in 50 ml of THF. At 20° C., 0.54 g (2.83 mmol) of 1-(tert-butyl)-4-phenyl-1-aza-buta-1,3-diene and 0.07 g of magnesium were added in succession. The reaction commenced after only 5 minutes. The colour of the suspension changed from yellow to orange over a period of 2 hours. Stirring was continued until the entire quantity of magnesium was consumed. At the end of the reaction the solvent was removed to dryness in vacuo and the residue was extracted with 30 ml of diethyl ether. 0.79 g of 2,2'-[(rac-ethylene-bis(1-indenyl)]-1-(tert-butyl)-3-phenyl-1-aza-2-zircona-cyclopent-4-ene was isolated from the diethyl ether extract in the form of an orange-coloured solid (yield: 52%, characterised by $^1$H-NMR and $^{13}$C-NMR).

Preparation of the catalyst solution 45.2 mg (83.3 μmol) of 2,2'-[(rac-ethylene-bis(tetrahydroindenyl)]-1-(tert-butyl)-3-phenyl-1-aza-2-zircona-cyclopent-4-ene were dissolved in 14.6 ml of hexane and 2.1 ml of triisobutylaluminium (TIBA). This catalyst solution was stored at 20° C. in a Schlenk vessel under argon.

Terpolymerization of ethylene, propylene and ENB

The polymerization according to Example 10 was repeated, except that 500 ml of hexane, 0.1 ml of TIBA und 0.5 ml of the catalyst solution of Example 11 were initially introduced into the autoclave. 49 g of propylene, 11 g of ethylene und 5 ml of ENB were added and the content of the autoclave was heated to 60° C. The polymerization was initiated by adding a solution of 4.6 mg of CPh3[B(C6F5)4] in 5 ml of toluene. Then ethylene was added continuously at a pressure of 4 bar. After a polymerization period of 75 min the reaction was terminated. 70.5 g of a terpolymer with an incorporation ratio of 70.5% ethylene, 23.4% propylene und 6.4% ENB were obtained. The Tg measured by DSC is −45° C.

Example 12

Preparation of 1,3-dicyclohexyl-6-methyl-5-phenyl-4-(1-methyl-2-phenyl-ethen-1-yl)-1,3-diaza-2-titana-cvclohept-6-ene-2-spiro-2'-(1'-cyclohexyl-4'-methyl-3'-phenyl-1'-aza-2'-titana-cyclopent-4'-ene 4.19 g (18.42 mmol) of 1-(cyclohexyl)-3-methyl-4-phenyl-1-aza-buta-1,3-diene and 0.45 g of magnesium were added to a solution of 3.00 g (9.21 mmol) of a titanium tetrachloride/THF adduct in 100 ml of THF and the mixture was stirred for 12 hours at 20° C. until the metal had reacted completely. At the end of the reaction the solvent was removed to dryness in vacuo and the residue was extracted with 30 ml of pentane. 2.4 g of 1.3-dicyclohexyl-6-methyl-5-phenyl-4-(1-methyl-2-phenyl-ethen-1-yl)-1,3 -diaza-2-titana-cyclohept-6-ene-2-spiro-2'-(1'-cyclohexyl-4'-methyl-3'-phenyl-1'-aza-2'-titana-cyclopent-4'-ene were precipitated from the pentane extract at −5° C. in the form of a black crystalline solid. (Yield: 36%, characterised by $^1$H-NMR and $^{13}$C-NMR spectroscopy).

Preparation of the catalyst solution 80.2 mg (122.7 μmol) of 1,3-dicyclohexyl-6-methyl-5-phenyl-4-(1-methyl-2-phenyl-ethen-1-yl)-1,3-diaza-2-titana-cyclohept-6-ene-2-spiro-2'-(1'-cyclohexyl-4'-methyl- 3'-phenyl-1'-aza-2'-titana-cyclopent-4'-ene were dissolved in 3.1 ml of hexane and 3.1 ml of trisobutylaluminium (TIBA).

Polymerization of ethylene 100 ml of hexane and 1 ml of the catalyst solution from Example 12 were initially introduced into a 250 ml glass reactor. Then ethylene was continuously introduced into the solution via a gas feed pipe at a pressure of 1.1 bar. The polymerization was initiated by adding a solution of 36.9 mg of CPh3[B(C6F5)4] in 5 ml of toluene. At a temperature of 40° C. and an ethylene pressure of 1.1 bar the reaction was terminated after a period of polymerization of 15 min by adding 10 ml of methanol and the resulting polymer was filtered off, washed with acetone and dried in a vacuum drying cabinet. 350 mg of polyethylene were obtained.

Example 13

Preparation of bis[2,2'-S-bis(4-methyl-6-tert-butyl-phenolato)]-1-(tert-butyl)-3-phenyl-1-aza-2-titana-cyclopent-4-ene 1.15 g (6.14 mmol) of 1-(tert-Butyl)-4-phenyl-1-azabuta-1,3-diene and 0.15 g of magnesium were added to a solution of 2.92 g (6.14 mmol) of bis[2,2'-S-(4-methyl-6-tert-butyl-phenolato)]titanium dichloride in 100 ml of tetrahydrofuran and the mixture was stirred at room temperature until the metal had reacted completely. Then the solvent was removed to dryness in vacuo and the residue extracted with 30 ml of pentane. 3.2 g of bis[2,2'-S-bis(4-methyl-6-tert-butyl-phenolato)]-1-(tert-butyl)-3-phenyl-1-aza-2-titana-cyclopent-4-ene were isolated from the pentane extract in the form of a brown solid. (Yield: 88%, characterised by $^1$H-NMR and $^{13}$C-NMR spectroscopy).

Polymerization of ethylene 100 ml of toluene and 5 ml of a 10% solution of methylalumoxane (MAO) were initially introduced into a 250 ml glass reactor. Then ethylene was introduced into the solution continuously via a gas feed pipe at a pressure of 1.1 bar. The polymerization was initiated by adding a solution of 5.3 mg (8 μmol) of bis[2,2'-S-bis(4-methyl-6-tert-butyl-phenolato)]-1-(tert-butyl)-3-phenyl-1-aza-2-titana-cyclopent-4-ene in 5 ml of toluene. At a temperature of 40° C. and an ethylene pressure of 1.1 bar the reaction was terminated after a period of polymerization of 15 min by adding 10 ml of methanol. The resulting polymer was filtered off, washed with acetone and dried in a vacuum drying cabinet. 0.97 g of polyethylene were obtained.

We claim:

1. A catalyst system of:

a) A monoazadiene metal complex of the formula

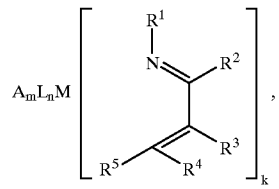

wherein

M is a metal from Group IIIb, IVb, Vb, VIb or the lanthanides or actinides of the periodic table, A signifies an optionally monobridged or polybridged anionic ligand, $R^1$, $R^2$, $R^3$, $R^4$, $R^5$ are the same or different and stand for hydrogen, a cyano group, halogen, a $C_1$ to $C_{20}$ alkyl group, a $C_1$ to $C_{10}$ fluoroalkyl group, a $C_6$ to $C_{10}$ fluoroaryl group, a $C_1$ to $C_{10}$ alkoxy group, a $C_6$ to $C_{20}$ aryl group, a $C_6$ to $C_{10}$ aryloxy group, a $C_2$ to $C_{10}$ alkenyl group, a $C_7$ to $C_{40}$ arylalkyl group, a $C_7$ to $C_{40}$ alkylaryl group, a $C_8$ to $C_{40}$ arylalkenyl group, a $C_2$ to $C_{10}$ alkynyl group, a silyl group optionally substituted by $C_1$-$C_{10}$ hydrocarbon radicals or $R^1$, $R^2$, $R^3$, $R^4$, $R^5$ form, together with the atoms linking them in each case, one or more aliphatic or aromatic ring systems, which may contain one or more heteroatoms of O, N or S and have 5 to 10 carbon atoms, L signifies a neutral ligand, n is a number from 0 to 10, m is 0, 1, 2, 3 or 4 and k is 1, 2, or 3 and the sum of m+k is 1 to 5, as a function of the oxidation number of M and b) a co-catalyst suitable for activating the metal complex a), wherein the molar ratio of component a) to component b) is in the range of 1:0.1 to 1:10,000.

2. The catalyst system of claim 1, wherein the molar ratio of component a) to component b) is in the range of 1:1 to 1:1000.

3. A method of preparing a polymer from unsaturated compounds, which comprises polymerizing the unsaturated compounds in the presence of the catalyst system of claim 1.

4. A method of preparing a polymer from unsaturated compounds, which comprises polymerizing the unsaturated compounds in the presence of the catalyst system of claim 2.

5. The method of claim 3, wherein the unsaturated compounds are dienes or olefins.

6. The method of claim 4, wherein the unsaturated compounds are dienes or olefins.

7. The method of claim 3, wherein the polymer is a rubber.

8. The method of claim 4, wherein the polymer is a rubber.

9. The method of claim 5, which comprises polymerizing or copolymerizing ethylene.

10. The method of claim 6, which comprises polymerizing or copolymerizing ethylene.

* * * * *